(12) United States Patent
Whitten

(10) Patent No.: US 9,179,189 B2
(45) Date of Patent: Nov. 3, 2015

(54) SYSTEMS AND METHODS OF RECORDING TIME OFFSET FOR VIDEO RECORDING DEVICES AND SERVICES

(71) Applicant: COX COMMUNICATIONS, INC., Atlanta, GA (US)

(72) Inventor: Robert Clark Whitten, Kennesaw, GA (US)

(73) Assignee: Cox Communications, Inc., Atlanta, GA (US)

( * ) Notice: Subject to any disclaimer, the term of this patent is extended or adjusted under 35 U.S.C. 154(b) by 156 days.

(21) Appl. No.: 14/100,946

(22) Filed: Dec. 9, 2013

(65) Prior Publication Data

US 2015/0163547 A1    Jun. 11, 2015

(51) Int. Cl.
| | | |
|---|---|---|
| G06F 3/00 | (2006.01) | |
| G06F 13/00 | (2006.01) | |
| H04N 5/445 | (2011.01) | |
| H04N 21/458 | (2011.01) | |
| H04N 21/472 | (2011.01) | |
| H04N 5/781 | (2006.01) | |
| H04N 21/433 | (2011.01) | |
| H04N 21/262 | (2011.01) | |
| H04N 21/242 | (2011.01) | |
| H04N 21/43 | (2011.01) | |

(52) U.S. Cl.
CPC .......... *H04N 21/4583* (2013.01); *H04N 5/781* (2013.01); *H04N 21/242* (2013.01); *H04N 21/26283* (2013.01); *H04N 21/4302* (2013.01); *H04N 21/4334* (2013.01); *H04N 21/47214* (2013.01); *H04N 2005/44547* (2013.01)

(58) Field of Classification Search
CPC .......... H04N 21/242; H04N 21/26283; H04N 21/4302; H04N 21/4334; H04N 21/44547; H04N 21/4583; H04N 21/47214
See application file for complete search history.

(56) References Cited

U.S. PATENT DOCUMENTS

| | | | | |
|---|---|---|---|---|
| 2010/0040345 | A1* | 2/2010 | Beach ................ | H04N 5/44543 386/296 |
| 2010/0131989 | A1* | 5/2010 | Casimere ........... | H04N 21/2393 725/62 |
| 2011/0167455 | A1* | 7/2011 | Gao ....................... | H04H 40/18 725/50 |
| 2013/0129321 | A1* | 5/2013 | McClanahan .......... | H04N 5/782 386/296 |

* cited by examiner

*Primary Examiner* — Joshua Taylor
(74) *Attorney, Agent, or Firm* — Benjamin A. Balser; Balser & Grell IP Law

(57) ABSTRACT

Methods and systems are provided for recording time offset for video recording devices and services including receiving a request to record a program, wherein the program is associated with show schedule information including a start time and a channel identifier, determining that the channel identifier is associated with at least one offset value, calculating an offset start time based at least in part on the start time and the offset value, and storing a scheduled record time for the program using the offset value.

20 Claims, 6 Drawing Sheets

| Channel Name | Channel No. | Start Recording Offset Delta (minutes) | End Recording Offset Delta (minutes) |
|---|---|---|---|
| ABC | 003 | 0 | 0 |
| CBS | 004 | +3 | +3 |
| NBC | 005 | 0 | 0 |
| CNN | 833 | -1 | +1 |
| PBS | 840 | +1 | -1 |
| MTV | 850 | 0 | 0 |
| Comedy Central | 868 | +1 | +1 |

FIG. 3

SYSTEMS AND METHODS OF RECORDING TIME OFFSET FOR VIDEO RECORDING DEVICES AND SERVICES

TECHNICAL FIELD

The present disclosure is generally related to scheduling content recording and, more particularly, is related to scheduling content recording using a channel or group based offset for same.

BACKGROUND

Developments in time shifting recording and playback technology such as the digital video recorder (DVR), have greatly reduced the complexity of recording shows for later viewing when compared to use of the VCR to record a television program onto a video cassette. Thanks to network connectivity to such things such as system clocks at the service provider, there is a good chance that we are past the days of an entertainment system component constantly flashing high noon "12:00" indefinitely.

While it is possible that we are beyond the aforementioned high noon situation, that is not to say that system clock times are always in sync. For example, if there is a disagreement between the system clock time of a service provider and the system clock of a content provider, part of a recorded show could be cut off. Thus, shortcomings still exist with current systems and there are heretofore unaddressed needs with previous solutions.

SUMMARY

Example embodiments of the present disclosure can be viewed as providing methods for recording time offset for video recording devices and services. In this regard, one embodiment of such a method, among others, can be broadly summarized by the following steps: receiving a request to record a show, wherein the show is associated with show schedule information including a start time and a channel identifier, determining that the channel identifier is associated with at least one offset value, calculating an offset start time based at least in part on the start time and the at least one offset value, and scheduling a recording of the show to begin at the offset start time.

According to yet another embodiment of the present disclosure, a method for providing recording time offset for video recording devices and services is provided including the steps of: receiving a request to record a content item, wherein the content item is associated with show schedule information including a start time, a duration, and a channel identifier, determining that the channel identifier of the content item is associated with a channel group, determining that the channel group is associated with a first offset period and a second offset period, calculating an offset start time based at least in part on the content item start time and the first offset period of the channel group, and scheduling the recording of the content item to begin at the offset start time.

According to still yet another embodiment of the present disclosure, example embodiments of the present disclosure provide systems for recording time offset for video recording devices and services that can be implemented as follows: at least one memory operable to store computer-executable instructions, at least one communications interface to access the at least one memory, and at least one processor configured to access the at least one memory via the at least one communications interface and execute the computer-executable instructions to: receive a request to record a content item, wherein the content item is associated with show schedule information including a start time, a duration, and a channel identifier, determine that the channel identifier is associated with a channel group, determine that the channel group is associated with a first offset period, calculate an offset start time based at least in part on the start time and the first offset period, and schedule a record time for the content item at the offset start time.

BRIEF DESCRIPTION OF THE DRAWINGS

FIG. 3 schematically illustrates a recording offset configuration screen in accordance with an example embodiment of the present disclosure.

DETAILED DESCRIPTION

Figure 1:
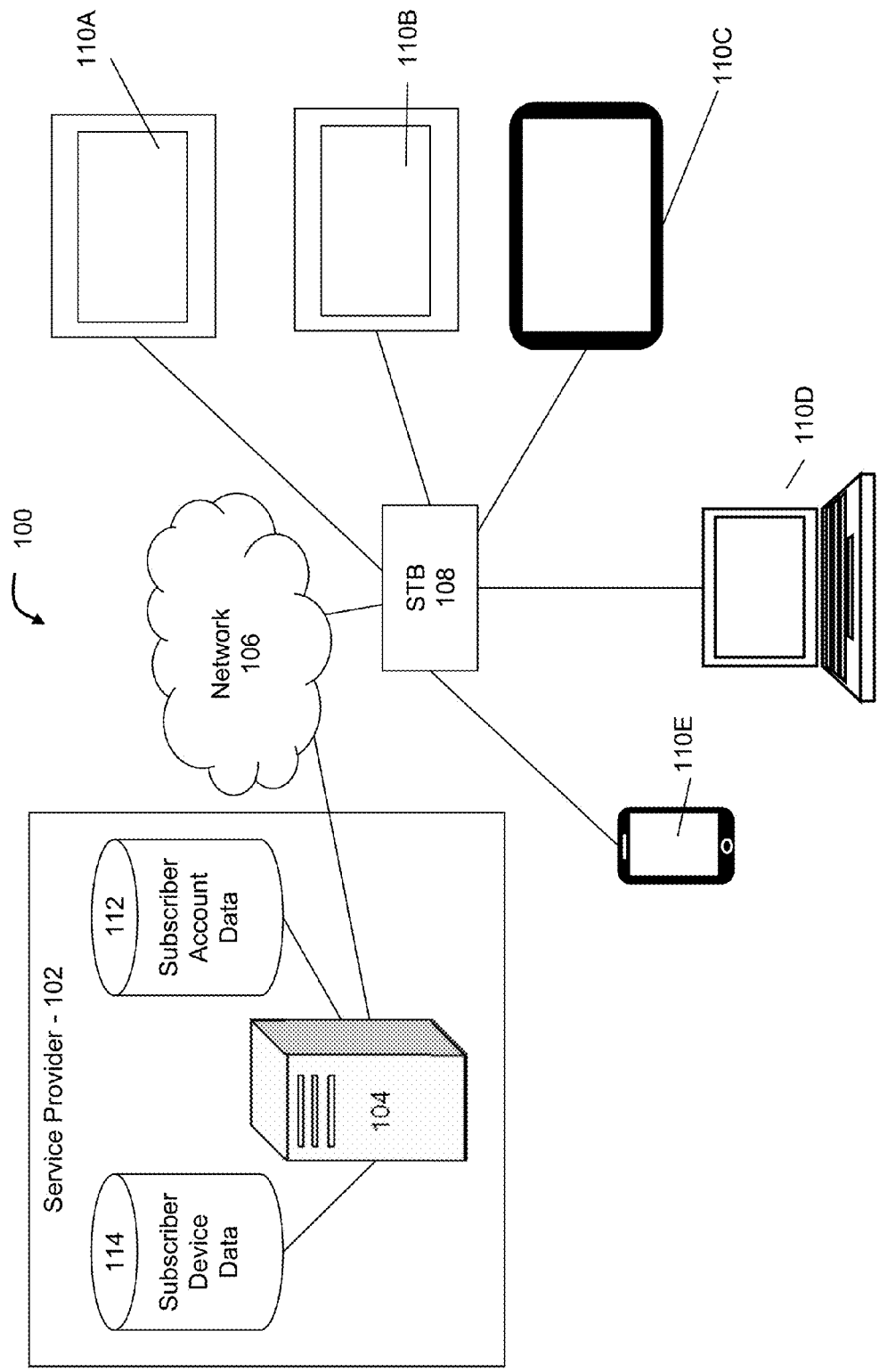
FIG. 1 illustrates an example environment in which an embodiment in accordance with the present disclosure may be practiced.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following description, numerous details are set forth to provide an understanding of the present disclosure. However, it will be understood by those of ordinary skill in the art that the present disclosure may be practiced without these details and that numerous variations or modifications from the described embodiments may be possible. The disclosure will now be described with reference to the figures, in which like reference numerals refer to like, but not necessarily the same or identical, elements throughout. For purposes of clarity in illustrating the characteristics of the present disclosure, proportional relationships of the elements have not necessarily been maintained in the figures.

Referring now to the drawings in which like numerals represent like elements or steps throughout the several views, FIG. 1 is block diagram of example environment 100 for providing recording time offset for video recording devices and services in accordance with the present disclosure. Example environment 100 may comprise service provider 102, such as an Internet Service Provider, or Cable Television Provider, that includes service provider server 104 attached to multiple data repositories including subscriber account data 112 and subscriber device data 114.

Content from service provider 102 may be transmitted for distribution over network 106 to Set Top Box (STB) 108 and one or more networked devices 110A-E. Content may either be sent directly to networked devices 110A-E or sent to STB 108 (also a networked device) for use on networked devices 110A-E. Examples of content include audio, video, system clock times, and/or other data and/or signals, instructions, directions, and messages.

Service provider server 104 may comprise a computing device as described below with respect to FIG. 2. Consistent with embodiments of the disclosure, service provider server 104 may comprise one or more software applications (i.e., a series of instructions configured for execution by a processing unit) associated with another component, such as one or more servers or dedicated content devices. Additionally, service provider server 104 may include remotely accessible features and functions that are the same as those of STB 108 to serve as cloud or network based DVR.

Network 106 (also referred herein as distribution network or communication network) is, generally, used and implemented by a cable service provider (such as, but not limited to, a wired and/or wireless communication service provider) to enable the service provider to provide, and the service provider's subscribers to receive content and communication services. Network 106 additionally refers to infrastructure, including apparatuses and methods, operative and utilized to communicate data and/or signals between networked devices such as service provider server 104, STB 108, and networked devices 110A-E. Similarly, for example and not limitation, network 106 may include current and future wired and/or wireless communication infrastructure for communicating video, audio, or other data and/or signals such as the public switched telephone communication network, cable and/or satellite telecommunications service provider communication networks, other service provider communication networks, and the Internet.

Additionally, network 106 may include any telecommunication and/or data network, whether public, private, or a combination thereof, including a local area network, a wide area network, an intranet, an Internet, the Internet, intermediate hand-held data transfer devices, and/or any combination thereof and may be wired and/or wireless. Network 106 may also allow for real-time, off-line, and/or batch transactions to be transmitted between or among service provider server 104, STB 108, and networked devices 110A-E. Due to network connectivity, various methodologies as described herein may be practiced in the context of distributed computing environments.

Although STB 108 is shown for simplicity in an example embodiment as being in communication with service provider server 104 via one intervening network 106, it is to be understood that other network configurations may be used. For example, intervening network 106 may include a plurality of networks, each with devices such as gateways and routers for providing connectivity between or among networks. Instead of, or in addition to network 106, dedicated communication links may be used to connect the various devices in accordance with example embodiments of the disclosure. For example, STB 108 may form the basis of network 106 that interconnects one or more networked devices 110A-E.

As shown in FIG. 1, components of example environment 100 including service provider 102, service provider server 104, STB 108, and networked devices 110A-E may be in communication with each other via a network such as network 106, which as described herein can include one or more separate or shared private and public networks, including the Internet or a publicly switched telephone network. STB 108 may include a stand alone or integrated devices such as a pc, media server, television tuner, satellite or cable receiver, digital video recorder, video game console, Blu-ray player, tablet, smart device, embedded devices, and the like. Networked devices 110A-E may include one or more of video playback screen, tablet device, smart phone, PDA, or other devices with one or more connectivity options. Networked devices 110A-E may further include an LCD display device such as a monitor featuring an operating system, media browser, and the ability to run one or more software applications. Networked devices 110A-E may also include the same features, capabilities, hardware, and functionality of STB 108.

Service provider server 104 is shown in communication with multiple data repositories including subscriber account data 112 and subscriber device data 114. It will be appreciated that the terms subscriber and user are used interchangeably herein. It will further be appreciated that the terms networked and connected are used interchangeably herein. While illustrated as separate data repositories, it is to be understood that information included in repositories 112 and 114 may be stored in a single repository, or multiple repositories across different locations.

In an example embodiment, subscriber account data 112 and subscriber device data 114 may include remote or cloud based storage of device preferences. Such information may be useful for backup and restoration purposes should a subscriber need to replace or upgrade one or more devices such as set top box 108 and one or more networked devices 110A-E such as a smart tablet and smart phone.

Figure 2:
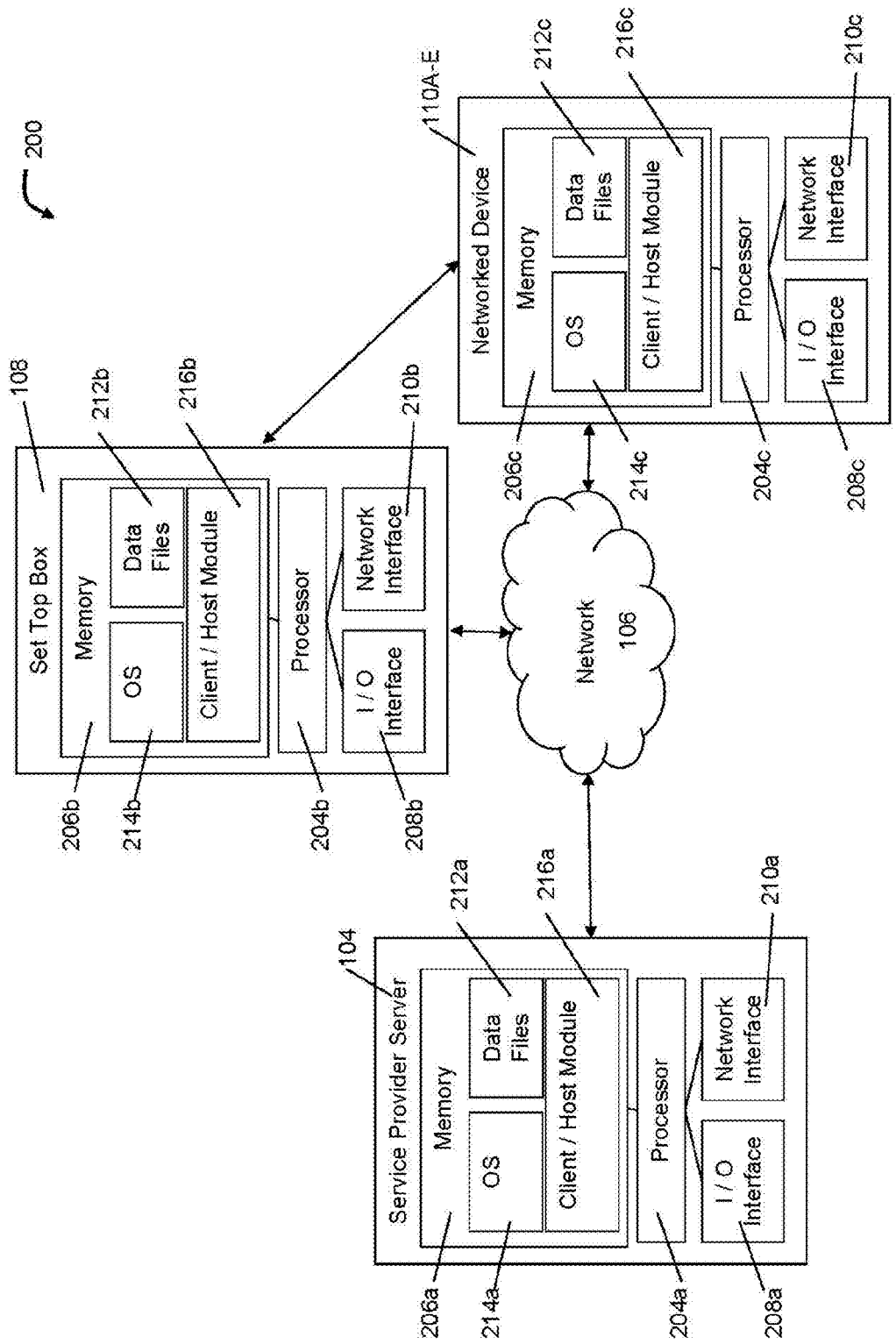
FIG. 2 illustrates an example system for supporting provision of recording offset times according to an example embodiment of the disclosure.

FIG. 2 illustrates example system 200 for supporting provision of recording time offset for video recording devices and services according to an example embodiment of the disclosure. Service provider server 104, STB 108, and networked devices 110A-E may be any processor-driven device, such as, but not limited to, a personal computer, laptop computer, handheld computer, dedicated processing device, and/or an array of computing devices. In addition to having processor 204a-c, server 104, STB 108, and networked devices 110A-E may further include memory 206a-c, input/output ("I/O") interface(s) 208a-c, and network interface 210a-c. Memory 206a-c may be any computer-readable medium, coupled to the processor, such as RAM, ROM, and/or a removable storage device for storing data files 212a-c and a database management system ("DBMS") to facilitate management of data files 212a-c and other data stored in memory 206a-c and/or stored in separate databases. Memory 206a-c may store data files 212a-c and various program modules, such as operating system ("OS") 214a-c and client module 216a-c. OS 214a-c may be, but is not limited to, Microsoft Windows®, Apple OSX™, Unix, Linux, Android, or a mainframe operating system. Client module 216a-c may be an Internet browser or other software, including a dedicated program, for interacting with server 104, network 106, STB 108, and/or networked devices 110A-E.

Suitable processors, such as processors 204a-c of service provider server 104, STB 108, and networked devices 110A-E, respectively, may comprise a microprocessor, an ASIC, and/or a state machine. Example processors may include those provided by Intel Corporation (Santa Clara, Calif.), AMD Corporation (Sunnyvale, Calif.), and Motorola Corporation (Schaumburg, Ill.). Such processors comprise, or may be in communication with media, for example computer-readable media, which stores instructions that, when executed by the processor, cause the processor to perform the elements described herein.

Generally, each of the memories and data storage devices, such as memories 206a-c and databases 112 and 114 (as shown in FIG. 1), and/or any other memory and data storage device, can store data and information for subsequent retrieval. In this manner, systems can store various received or collected information in memory or a database associated with service provider server 104, STB 108, and/or networked devices 110A-E. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

As used herein, the term "computer-readable medium" may describe any form of memory or a propagated signal transmission medium. Propagated signals representing data and computer program instructions may be transferred between network devices and systems. Embodiments of computer-readable media include, but are not limited to, electronic, flash, optical, magnetic, or other storage or transmission devices capable of providing a processor with computer-readable instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Generally, service provider server 104, STB 108, and networked devices 110A-E have hardware and/or software for transmitting and receiving data and/or computer-executable instructions over a communications link and a memory for storing data and/or computer-executable instructions. These devices and systems may also include a processor for processing data and executing computer-executable instructions locally and over network 106, as well as other internal and peripheral components that are well known in the art.

Still referring to service provider server 104, STB 108, and networked devices 110A-E, I/O interface(s) 208a-c may facilitate communication between processor 204a-c and various I/O devices, such as a keyboard, mouse, printer, microphone, speaker, monitor, bar code readers/scanners, RFID readers, and the like. Network interface 210a-c may take any of a number of forms, such as a network interface card, a modem, a wireless network card, and the like. It will be appreciated that while service provider server 104, STB 108, and networked devices 110A-E have been illustrated as a single computer or processor, service provider server 104, STB 108, and networked devices 110A-E may be comprised of a group of computers or processors, according to an example embodiment of the disclosure.

As previously mentioned, network 106 may takes many forms, including a public and/or a private network, such as a cable television distribution network (e.g., a hybrid fiber-coax network), a cellular data network, a metropolitan network, and/or the Internet.

Example environment 100 shown in and described with respect to FIGS. 1 and 2 are provided by way of example only. Numerous other operating environments, system architectures, and device configurations are possible. Other system embodiments can include fewer or greater numbers of components and may incorporate some or all of the functionality described with respect to the system components shown in FIGS. 1 and 2.

For example, in one embodiment, service provider server 104 (or STB 108/networked devices 110A-E) may be implemented as a specialized processing machine that includes hardware and/or software for performing the methods described herein. In addition, the processor and/or processing capabilities of service provider server 104, may be implemented as part of STB 108, networked devices 110A-E, or any portion or combination thereof. Accordingly, embodiments of the disclosure should not be construed as being limited to any particular operating environment, system architecture, or device configuration.

As used herein, "show schedule with duration" refers to meta data about a show including a start time, a duration, and a channel identifier. In an example embodiment, this contains an end time value. "Show schedule without duration" is meta data about a show including a start time, an end time, and a channel identifier. "Offset value" refers to the value associated with an offset, which can be used in conjunction with start time or end time. "Start time" refers to the value in the show schedule indicating when the show is scheduled to start. "End time" refers to the value in the show schedule indicating when the show is scheduled to end. "Duration" refers to the value in the show schedule or calculated from start time and end time that indicates the length of a scheduled show. "Start offset delta" refers to the offset value associated with the start of a recording, which determines how much sooner or later the show should start recording than the start time. "End offset delta" refers to the offset value associated with the end of a recording, which determines how much sooner or later the show should stop recording than the end time.

"Adjusted recording time" refers to the start time and end time used by the video recording system, based on the video recording system's clock, to record a show. The data for the adjusted recording time may be based on combining offset values, start time, and end time, as appropriate. "Adjusted start time" refers to the start time used by the video recording system, based on the video recording system's clock, to start recording a show. This data for this term is based on combining start time and start offset delta. "Adjusted end time" refers toi the end time used by the video recording system, based on the video recording system's clock, to stop recording a show. This data for this term is based on combining end time and end offset delta. "Content information" is a synonym for show schedule. "Channel group" refers to a grouping of channels which share the same combination of start offset delta and end offset delta values.

FIG. 3 schematically illustrates recording offset configuration screen 300 in accordance with an example embodiment of the present disclosure. Recording offset configuration screen 300 includes channel name column 310, channel number column 312, start recording offset column 314, and end recording offset column 316. An offset value is the value associated with an offset, which can be used in conjunction with start time or end time. As shown, each of channel information rows displays channel name 310A-G and channel number 312A-G as well as multiple start offset values shown here as start offset delta values 314A-G and end offset delta values 316A-G. Offset value is used interchangeably with offset delta and may also be referred to as an offset delta value. Start offset delta 314 and end offset delta 316 are expressed in minutes; however, it will be appreciated that other units of time may be used such as seconds, hours, days, and the like.

As shown, offset delta values may be expressed in (+) plus or (−) negative units, where a +3 minute start offset delta would result in an adjusted recording start time that begins 3 minutes later than the show start time from the show schedule information according to the system clock. A −3 minute start offset delta would result in an adjusted recording start time that begins 3 minutes prior to the show start time from the show schedule information according to the system clock. The duration specified in the show information may be used to determine an adjusted end time value by adding it to the adjusted start time and by adding any end time offset value to compute the time to stop recording. Alternatively, the duration is calculated from the show information by taking the originally scheduled end time minus the originally scheduled start time. Once the scheduled duration is determined, it may be used as if it were supplied in the show information.

It will be further appreciated that channel name 310, channel number 312, and/or some combination thereof, may be used as a channel identifier. Other channel identification schemes may be used as well.

Start offset delta 314 and end offset delta 316 may be provided by one or more sources. Start offset delta value indicates that the scheduled recording start time should be adjusted by the specified delta value with respect to the local system clock. For example, a viewer may have experience with a certain channel causing shows to be cut off early because the channel for which shows are recorded consistently has not started or ended the show based on the DVR system clock. The user may include a +1 minute start offset delta to delay the time a show is recorded and a +1 minute end offset delta if it has been the experience of that user, that the channel in question consistently starts a show 1 minute after the start time specified in the guide and ends the show 1 minute after the end time specified in the guide which causes the content in the show to be cut short. Other sources for start offset deltas 314 and end offset deltas 316 may include a service provider or third party.

As shown, channel 312B "004" has a start offset delta 314B of +3 minutes and an end offset delta 316B of +3 minutes. In use, when a user requests/instructs the recording of a 1 hour show on channel 004 at 1:00 PM, because of the offset start delta +3 and offset end delta +3 associated with channel 004, the recording will be scheduled for 1:03 PM and end at 2:03 PM according to DVR system clock time.

A listing for a show or content item may include metadata with various types of associated attributes or show schedule information. Show schedule information may include one or more of the following: a start time, end time, duration, channel identifier, show rating, synopsis, season number, episode number, content type, classification, and the like. Generally the duration of a content item is expressed as a length or period of time such as 45 minutes or 1 hour. Content information and show schedule information may be used interchangeably herein.

Figure 4:
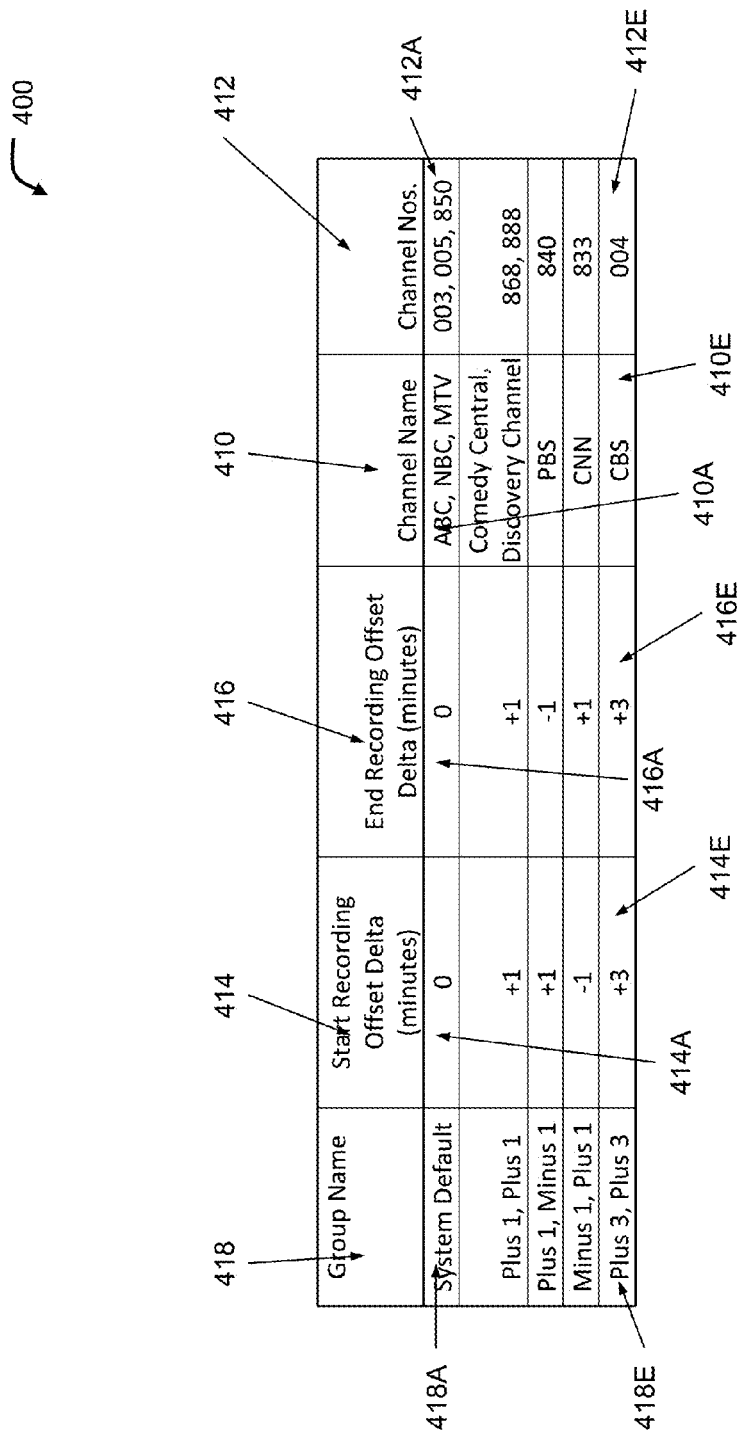
FIG. 4 schematically illustrates a recording offset configuration screen in accordance with an alternate example embodiment of the present disclosure.

FIG. 4 schematically illustrates a recording offset configuration screen in accordance with an alternate example embodiment of the present disclosure. Recording offset configuration screen 400 features rows grouped by name as shown in group name column 418, channel name column 410, channel number column 412, as well as start offset delta column 414, and end recording offset delta column 416. As shown, each of group information rows displays one or more channel names 410A-E and one or more channel numbers 412A-E as well as a start offset delta 414A-E and an end offset delta 416A-E. Start offset delta 414 and end offset delta 416 are expressed in minutes, however, it will be appreciated that other units of time may be used. As discussed with respect to FIG. 3, according to other embodiments, offset deltas may be expressed in units such as seconds, minutes, hours, days, and the like. FIG. 4 provides a more user friendly approach to offset delta management across the myriad of channels. The concept associated with FIG. 4 is a one-to-many relationship between offset value combinations and channels. For example, the system default start offset value of 0 and end offset value of 0 apply to multiple channels. Likewise, it is anticipated multiple channels will have the same adjusted start and end offset value combinations such as channels listed in 410B and 412B.

As discussed with respect to FIG. 3, start offset delta 414 and end offset delta 416 may be provided by one or more sources including, but not limited to a viewer, service provider, or third party.

Figure 5:
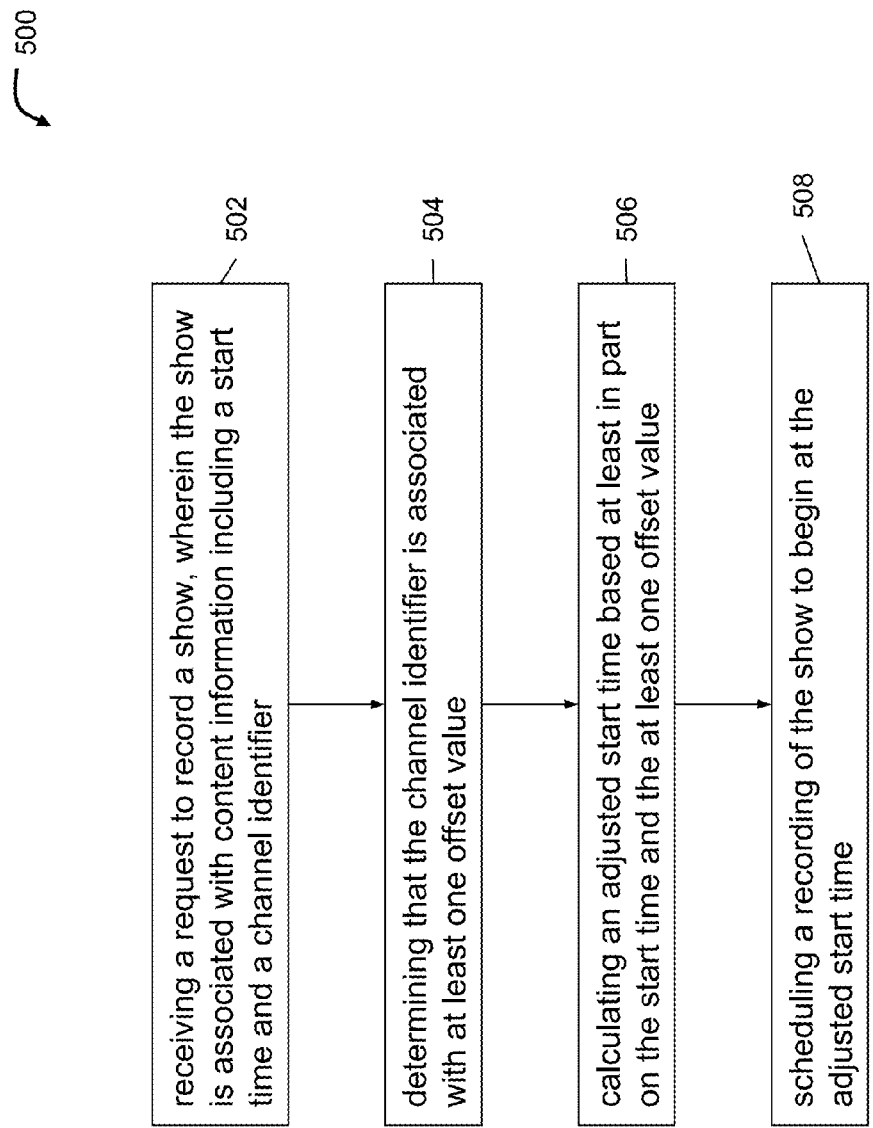
FIG. 5 is a flow diagram illustration of a method for providing a time offset by channel in accordance with an example embodiment of the disclosure.

FIG. 5 is an example flow diagram illustration of instructions 500 for providing recording time offset for video recording devices and services in accordance with an example embodiment of the disclosure. In block 502, a request to record a show is received, wherein the show is associated with content information including a start time and a channel identifier. At block 504, at least one offset value is determined for the associated channel identifier. At block 506, an adjusted start time is calculated based at least in part on the start time and the at least one offset value. At block 508, a recording of the show is scheduled to begin at the adjusted start time.

Figure 6:
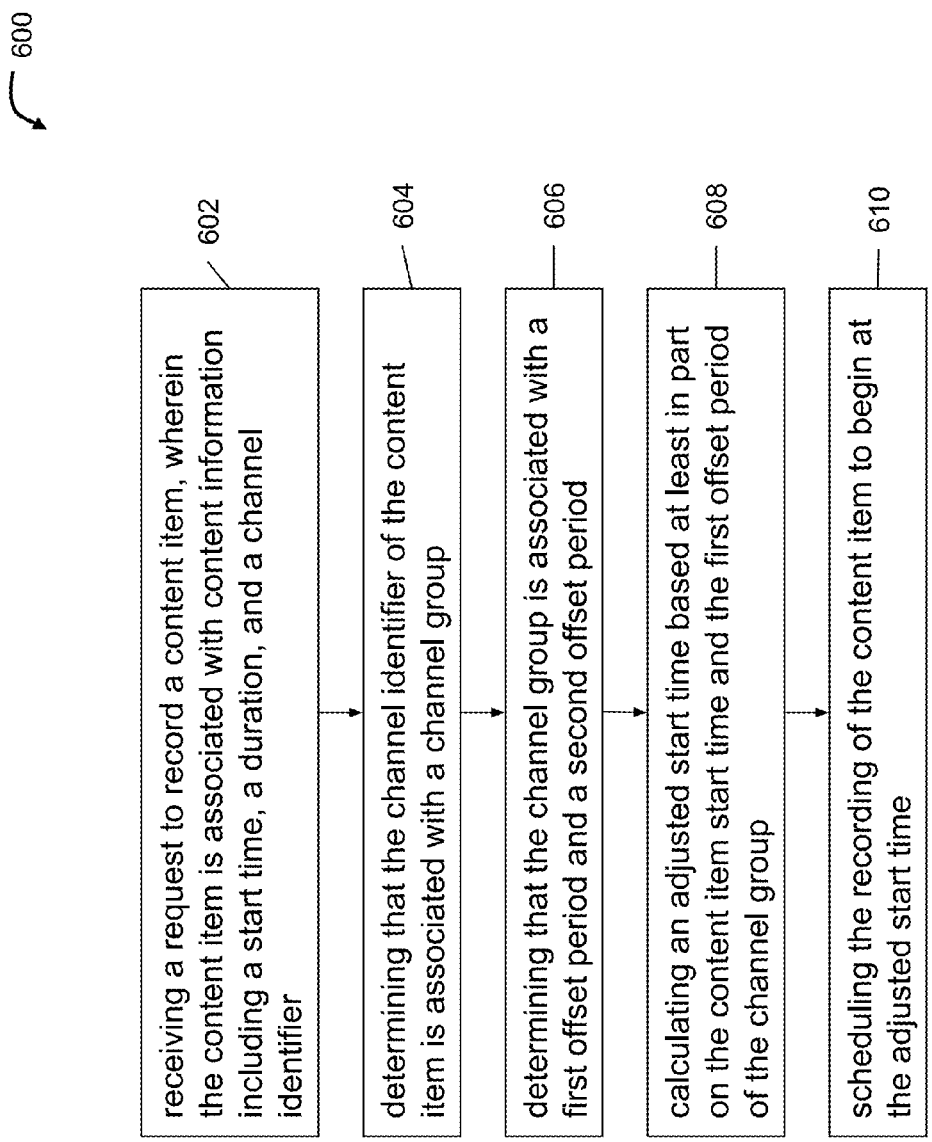
FIG. 6 is a flow diagram illustration of a method for providing a time offset by channel groups in accordance with another example embodiment of the disclosure.

FIG. 6 is an example flow diagram illustration of instructions 600 for providing recording time offset for video recording devices and services in accordance with an example alternate embodiment of the disclosure. In block 602, a request to record a content item is received, wherein the content item is associated with content information including a start time, a duration, and a channel identifier. At block 604, a channel group is determined from the associated channel identifier of the content item. At block 606, a start offset value and an end offset value associated with the channel group is determined. At block 608, an adjusted start time is calculated based at least in part on the content item start time and the start offset value of the channel group. At block 610, the recording of the content item is scheduled to begin at the adjusted start time.

It will be appreciated by one of ordinary skill in the art that the steps/instructions set forth in FIGS. 5 and 6 may be performed on service provider server 104, STB 108, or networked devices 110A-E.

The flow diagrams of FIGS. 5 and 6 show the architecture, functionality, and operation of a possible implementation of providing recording time offset for video recording devices and services. In this regard, each block represents a module, segment, or portion of code, which comprises one or more executable instructions for implementing the specified logical function(s). It should also be noted that in some alternative implementations, the functions noted in the blocks may occur out of the order noted in FIGS. 5 and 6. For example, two blocks shown in succession in FIGS. 5 and 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations can be made thereto without departing from the spirit and scope of the disclosure as defined by the appended claims.

Therefore, at least the following is claimed:

1. A method of providing a channel based recording offset value, comprising:
   receiving a request to record a show, wherein the show is associated with content information including a show schedule information and a channel identifier;
   automatically retrieving, by a processor, at least one offset value associated with the channel identifier from values stored in a memory;
   calculating an adjusted recording time based at least in part on the show schedule information and the at least one offset value; and
   scheduling a recording of the show at the adjusted recording time.

2. The method of claim 1 wherein show schedule information associated with the show further includes a duration.

3. The method of claim 2 further comprising calculating an adjusted end time based at least in part on the adjusted recording time and the duration.

4. The method of claim 3 further comprising scheduling the recording of the show to end at the adjusted end time.

5. The method of claim 1 wherein the adjusted recording time is based on a device system clock.

6. The method of claim 1 wherein show schedule information associated with the show further includes a show end time.

7. The method of claim 6 wherein determining at least one offset value associated with the channel identifier includes determining an end offset delta value associated with the channel identifier.

8. The method of claim 7 further comprising:
   calculating an adjusted end time based at least on the end offset value and the show end time; and
   scheduling a recording of the show to end at the adjusted end time.

9. A system for providing a recording offset, comprising:
   at least one memory operable to store computer-executable instructions;
   at least one communications interface to access the at least one memory; and
   at least one processor configured to access the at least one memory via the at least one communications interface and execute the computer-executable instructions to:
   receive a request to record a content item, wherein the content item is associated with show schedule information including a start time, a duration, and a channel identifier;
   determine a channel group associated with the channel identifier;
   retrieve a first offset delta value associated with the channel group from values stored in a memory;
   calculate an adjusted start time based at least in part on the start time and the first offset delta value; and
   schedule a record time for the content item at the adjusted start time.

10. The system of claim 9 further comprising computer-executable instructions to determine that the channel group is associated with a second offset delta value.

11. The system of claim 10 further comprising computer-executable instructions to calculate an adjusted end time based at least in part on the adjusted start time, the duration, and the second offset delta value.

12. The system of claim 11 further comprising computer-executable instructions to schedule the recording of the content item to end at the adjusted end time.

13. The system of claim 9 wherein the adjusted start time is based on a device system clock.

14. The system of claim 10 wherein schedule information associated with the content item further includes an end time.

15. The system of claim 14 comprising computer-executable instructions to calculate an adjusted end time based at least in part on the end time and the second offset delta value.

16. The system of claim 15 further comprising computer-executable instructions to schedule the recording of the content item to end at the adjusted end time.

17. A method for providing an offset value when scheduling a recording, comprising:
- receiving a request to record a content item, wherein the content item is associated with show schedule information including a start time, a duration, and a channel identifier;
- determining a channel group associated with a channel identifier of the content item;
- automatically retrieving, by a processor, a first offset period associated with the channel group from values stored in a memory;
- calculating an offset start time based at least in part on the content item start time and the first offset period of the channel group; and
- scheduling the recording of the content item to begin at the offset start time.

18. The method of claim 17, further comprising determining a second offset value associated with the channel group.

19. The method of claim 18 further comprising calculating an offset end time based at least in part on the offset start time, the duration, and a second offset period.

20. The method of claim 19 further comprising scheduling the recording of the content item to end at an offset end time.

\* \* \* \* \*